(12) United States Patent
Zheng et al.

(10) Patent No.: US 12,259,567 B2
(45) Date of Patent: Mar. 25, 2025

(54) STEREO IMAGING FILM

(71) Applicant: SHINE OPTOELECTRONICS (KUNSHAN) CO., LTD., Kunshan (CN)

(72) Inventors: Weiwei Zheng, Kunshan (CN); Jiang Yu, Kunshan (CN); Su Shen, Kunshan (CN)

(73) Assignee: Shine Optoelectronics (Kunshan) Co., Ltd., Kunshan (CN)

( * ) Notice: Subject to any disclaimer, the term of this patent is extended or adjusted under 35 U.S.C. 154(b) by 555 days.

(21) Appl. No.: 17/637,276

(22) PCT Filed: Jun. 17, 2020

(86) PCT No.: PCT/CN2020/096560
§ 371 (c)(1),
(2) Date: Feb. 22, 2022

(87) PCT Pub. No.: WO2021/036428
PCT Pub. Date: Mar. 4, 2021

(65) Prior Publication Data
US 2022/0283444 A1 Sep. 8, 2022

(30) Foreign Application Priority Data
Aug. 26, 2019 (CN) .......................... 201910792524.1

(51) Int. Cl.
*B42D 25/324* (2014.01)
*B42D 25/342* (2014.01)
*G02B 30/26* (2020.01)

(52) U.S. Cl.
CPC .......... *G02B 30/26* (2020.01); *B42D 25/324* (2014.10); *B42D 25/342* (2014.10)

(58) Field of Classification Search
CPC ............................ B42D 25/324; B42D 25/346
See application file for complete search history.

(56) References Cited

U.S. PATENT DOCUMENTS

2007/0291362 A1 12/2007 Hill et al.
2013/0038942 A1\* 2/2013 Holmes ................ B42D 25/351
359/619

FOREIGN PATENT DOCUMENTS

CN 1906547 A 1/2007
CN 101563640 A 10/2009
(Continued)

OTHER PUBLICATIONS

International Search Report from corresponding International Application No. PCT/CN2020/096560, mailed on Sep. 27, 2020, 8 pages.
(Continued)

*Primary Examiner* — Ryan D Howard
(74) *Attorney, Agent, or Firm* — Tucker Ellis LLP

(57) ABSTRACT

A stereo imaging film includes: a focusing layer including at least one focusing unit, the at least one focusing unit each includes a plurality of micro-nano structures; and a graphic layer including at least two graphic units in a same layer, the at least two graphic units each include a plurality of micrographics, the plurality of micrographics of the at least two graphic units have different arrangements. One of the at least one focusing unit is corresponding to the at least two graphic units, and the at least two graphic units form graphic images with different image heights through the focusing unit. Each focusing unit forms graphic images through the focusing units, and thus the technical problem of poor stereo sensation of the suspended image is solved.

9 Claims, 4 Drawing Sheets

(56) References Cited

FOREIGN PATENT DOCUMENTS

| | | |
|---|---|---|
| CN | 102869517 A | 1/2013 |
| CN | 104118236 A | 10/2014 |
| CN | 104191860 A | 12/2014 |
| CN | 106324726 A | 1/2017 |
| CN | 109239935 A | 1/2019 |
| CN | 109249716 A | 1/2019 |
| CN | 109445003 A | 3/2019 |
| CN | 109476173 A | 3/2019 |
| CN | 109581678 A | 4/2019 |
| CN | 210401858 U | 4/2020 |
| KR | 101203199 B1 | 11/2012 |

OTHER PUBLICATIONS

Office Action from corresponding Chinese Application No. 201910792524.1, dated Jul. 5, 2021, 13 pages.

* cited by examiner

STEREO IMAGING FILM

CROSS-REFERENCE TO RELATED APPLICATIONS

The present application is a National Phase of International Application No. PCT/CN2020/096560, filed on Jun. 17, 2020, which claims priority to Chinese Application No. 201910792524.1, filed on Aug. 26, 2019, the contents of both of which are incorporated herein by reference in their entireties.

TECHNICAL FIELD

The present disclosure relates to the technical field of optical films and, in particular, to a stereo imaging film.

BACKGROUND

At present, a Moire imaging film generally shows a simple floating or sinking Moire imaging visual effect. This kind of single-layer floating or sinking logo has a poor stereoscopic sensation, and the pattern formed is relatively simple.

Since the display effect of traditional Moire images is too simple, which only presents floating or sinking images. With the continuous development of micro-nano lithography technology, such simple and boring visual effect would easily cause aesthetic fatigue, and it is not difficult to imitate the images.

SUMMARY

In view of the above, embodiments of the present application provides a graphic layer and a stereo imaging film therewith to solve the technical problem that the floating image has a poor stereoscopic sensation.

The technical solution of the present application is as follows.

A stereo imaging film, including: a focusing layer comprising at least one focusing unit, wherein the at least one focusing unit each comprises a plurality of micro-nano structures; and a graphic layer comprising at least two graphic units in a same layer, wherein the at least two graphic units each comprise a plurality of micrographics, the plurality of micrographics of the at least two graphic units have different arrangements. One of the at least one focusing unit is corresponding to the at least two graphic units, and the at least two graphic units form graphic images with different image heights through the focusing unit.

In an embodiment, in one of the at least one focusing unit, the plurality of micro-nano structures are periodically arranged, the plurality of micrographics of the corresponding at least two graphic units are also periodically arranged, and periods thereof are different from each other.

In an embodiment, an image height of the graphic image is h; when h>0, the graphic image is floating, and when h<0, the graphic image is sinking.

In an embodiment, in one of the at least one focusing unit, the plurality of micro-nano structures are randomly arranged, and the plurality of micrographics of the corresponding at least two graphic units are also randomly arranged.

In an embodiment, position coordinates of the plurality of micrographics of the at least two graphic units are respectively obtained through different transformations according to position coordinates of the plurality of micro-nano structures of the focusing unit, and the transformations comprise coordinate scaling transformation and/or coordinate rotation transformation.

In an embodiment, one micro-nano structure of the plurality of micro-nano structures is corresponding to at least two micrographics of the plurality of micrographics.

In an embodiment, the at least two micrographics corresponding to the same micro-nano structure are arranged at intervals or have an overlapping portion or a common portion.

In an embodiment, in one of the at least one focusing unit, the micrographics of the same graphic unit have a same color, shape, size, and type; or the micrographics comprises in different graphic units have at least one difference in color, shape, type, or size.

In an embodiment, the stereo imaging film further includes a substrate layer and a reflection layer, wherein the graphic layer is formed on one side of the substrate layer, the focusing layer is formed on another side of the substrate layer, and the reflection layer is provided on a side of the focusing layer away from the graphic layer.

In an embodiment, the graphic layer of the stereo imaging film comprises grooves and fillers filled in the grooves, and adjacent micrographics of different graphic units have intersections located in a same groove.

The technical solution according to the present disclosure can achieve the following beneficial effects.

The focusing layer of the stereo imaging film according to the present disclosure is provided with one or more focusing units. The one or more focusing unit each includes a plurality of micro-nano structures. The graphic layer includes at least two graphic units, and the at least two graphic units each include a plurality of micrographics. Each focusing unit is corresponding to at least two graphic units of the same graphic layer, and each of the graphic units forms a graphic image through the focusing units, respectively, and thereby forms an image with a magnifying effect. Therefore, compared with the related art, the image formed in the present disclosure has a stronger stereo sensation. Moreover, at least two graphic units are provided on the same graphic layer, so that the process is simple, the imaging is clear, and the thickness of the stereo imaging film can be reduced.

It should be understood that the foregoing general description and the following detailed description are just exemplary and not the limitation to the present disclosure.

BRIEF DESCRIPTION OF DRAWINGS

In order to better illustrate the technical solutions of the embodiments in the present disclosure, the drawings used in embodiments will be introduced as follows. It is appreciated that, the drawings in the following description are only some embodiments of the present disclosure. For those skilled in the art, other drawings can also be obtained from these drawings without any creative effort.

REFERENCE SIGNS

Figure 1:
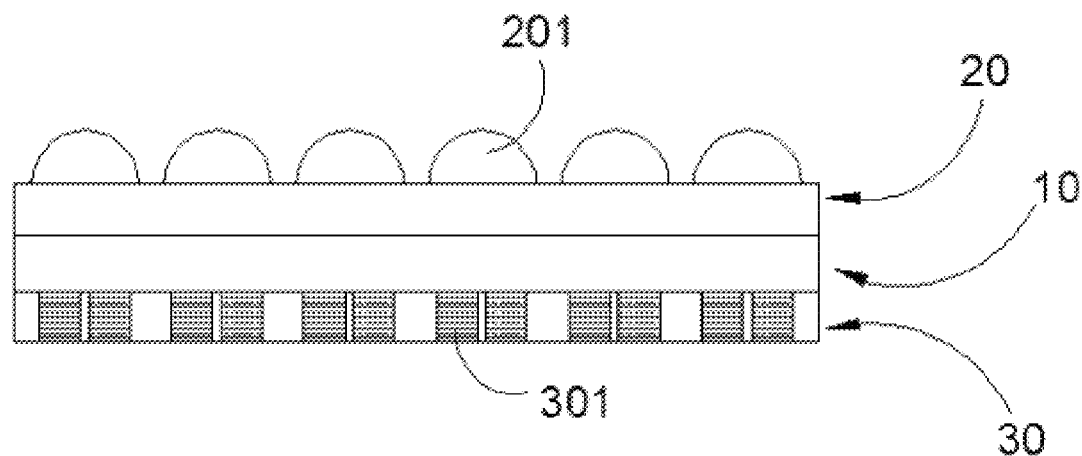
FIG. 1 is a schematic structural diagram of a first structure (including a substrate layer) of a stereo imaging film according to the present disclosure.

10—substrate layer;
20—focusing layer;
  201—micro-nano structure;
30—graphic layer;
  301—micrographics;
40—reflection layer;
50—first protection layer;
60—second protection layer.

DESCRIPTION OF EMBODIMENTS

In order to better understand the technical solutions of the present disclosure, embodiments of the present disclosure will be described in detail below with reference to the drawings.

It should be clear that the described embodiments are merely parts of the embodiments of the present disclosure, but not all of the embodiments. Based on the embodiments in the present disclosure, all the other embodiments obtained by those skilled in the art without creative effort fall into the protection scope of the present disclosure.

The terms used in the embodiments of the present disclosure are merely for the purpose of describing a certain embodiment, rather than limitations to the present disclosure. The singular form "a/an", "the", and "said" used in the embodiments and the claims in the present disclosure also aim at including the plural forms, unless the context clearly noted otherwise.

It should be understood that the term "and/or" used herein is merely an association relationship to describe the associated objects, which means that there may be three types of relations. For example, A and/or B can mean that A exists alone, A and B exist at the same time, or B exists alone. In addition, the character "/" herein generally indicates that the preceding and succeeding related objects are in an "or" relationship.

It should be noted that the directional words such as "above", "below", "left" and "right" described in the embodiments of the present disclosure are described in the perspective shown in the drawings, and should not be understood as the limitations to the embodiments of the present disclosure. In addition, in the context, it should also be understood that when an element is referred to as being connected "above" or "below" another element, it means that the element may not only be directly connected "above" or "below" another element, and may also indirectly connected "above" or "below" another element through intervening elements.

Figure 2:
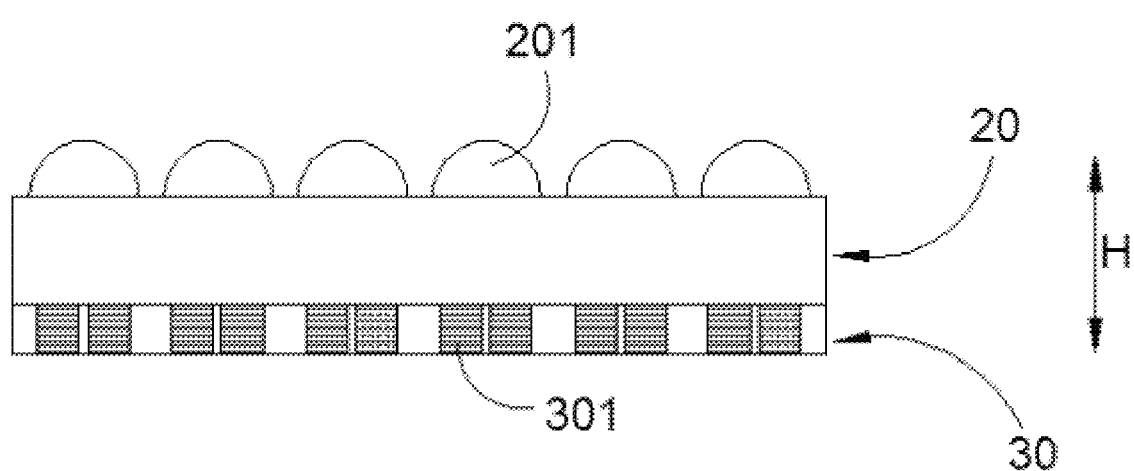
FIG. 2 is a schematic structural diagram of a second structure (excluding the substrate layer) of a stereo imaging film according to the present disclosure.
Figure 3:
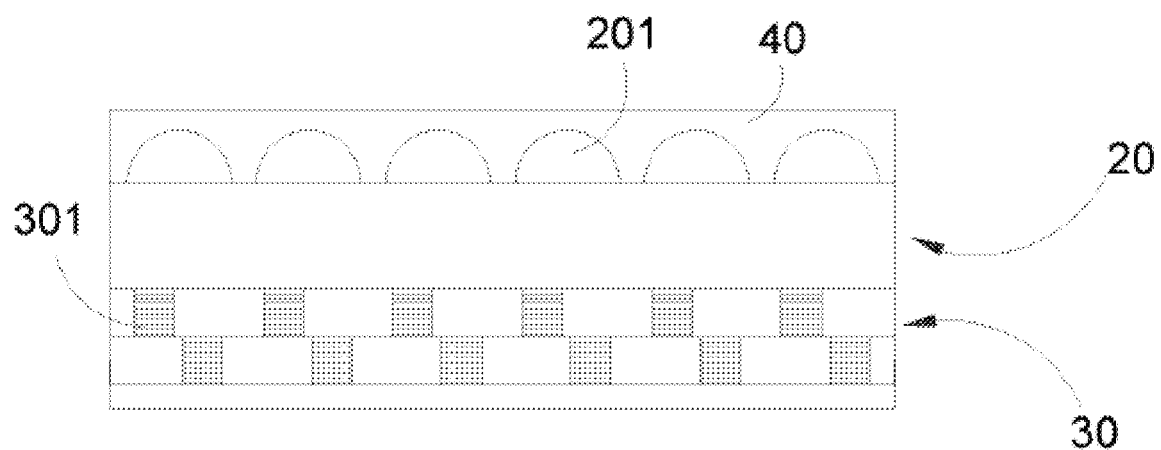
FIG. 3 is a schematic structural diagram of a third structure (including a reflection layer) of a stereo imaging film according to the present disclosure.
Figure 4:
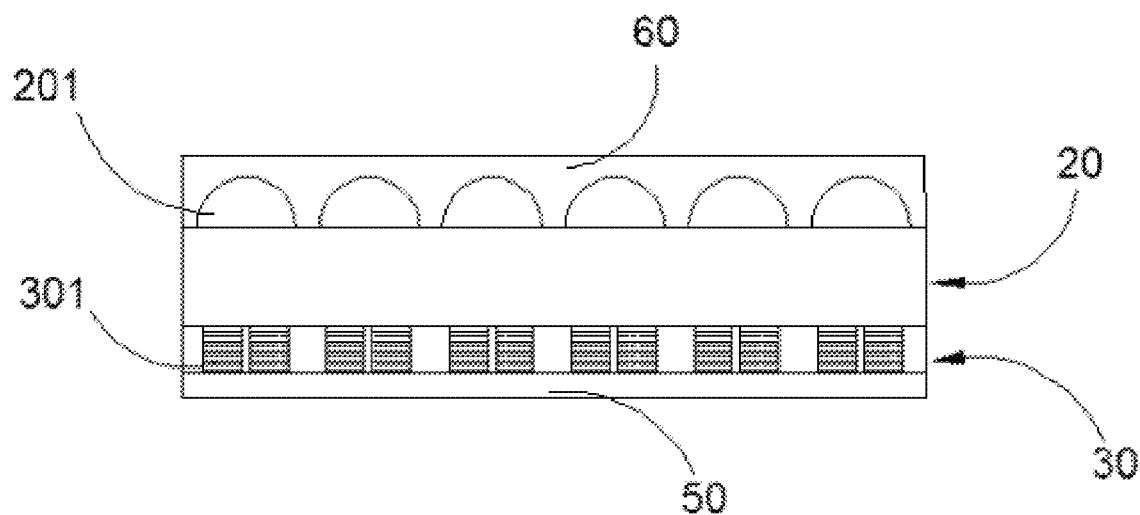
FIG. 4 is a schematic structural diagram of a fourth structure (including a protection layer) of a stereo imaging film according to the present disclosure.
Figure 5:
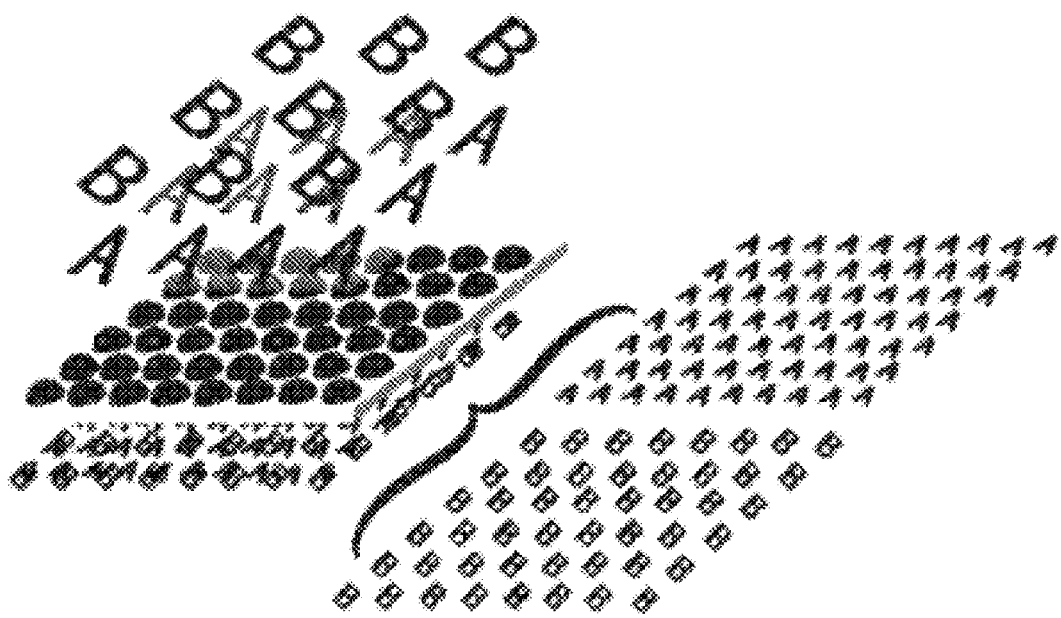
FIG. 5 is a schematic structural diagram of a stereo imaging film after imaging according to the present disclosure.
Figure 6:
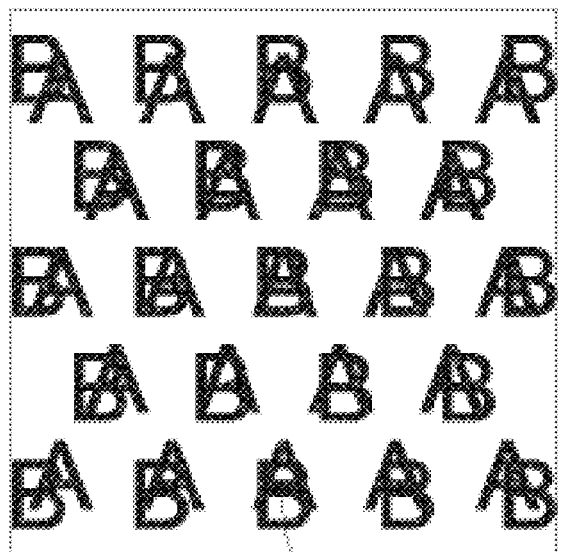
FIG. 6 is a schematic structural diagram of a graphic layer of a stereo imaging film according to the present disclosure.
Figure 7:
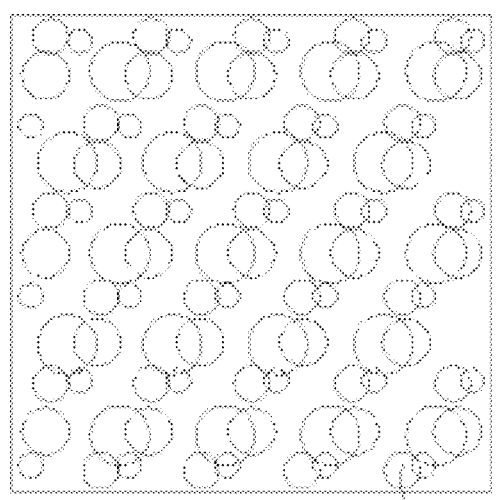
FIG. 7 is another schematic structural diagram of a graphic layer of a stereo imaging film according to the present disclosure.
Figure 8:
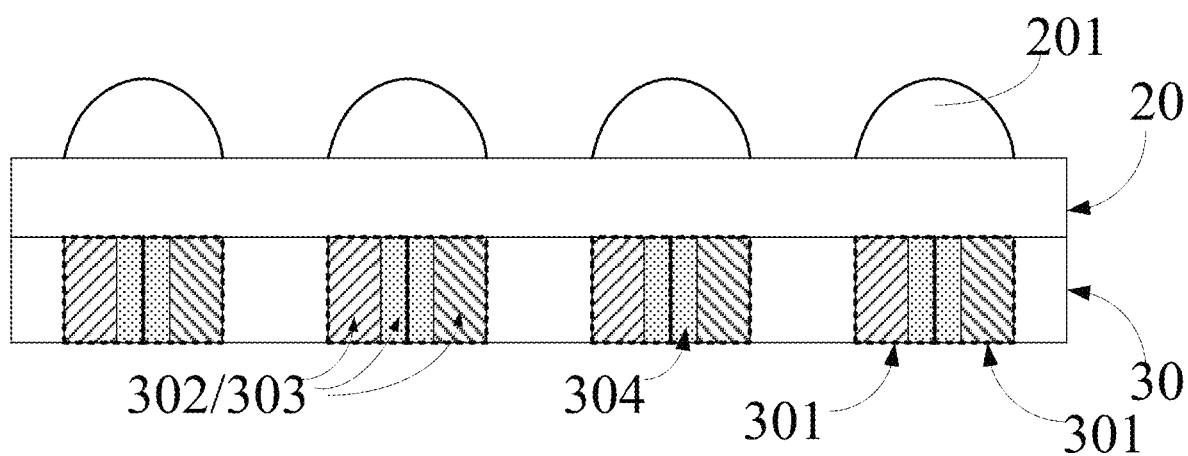

Referring to FIGS. 1-7, FIG. 1 is a schematic structural diagram of a first structure (including a substrate layer) of a stereo imaging film according to the present disclosure. FIG. 2 is a schematic structural diagram of a second structure (excluding the substrate layer) of a stereo imaging film according to the present disclosure. FIG. 3 is a schematic structural diagram of a third structure (including a reflection layer) of a stereo imaging film according to the present disclosure. FIG. 4 is a schematic structural diagram of a fourth structure (including a protection layer) of a stereo imaging film according to the present disclosure. FIG. 5 is a schematic structural diagram of a stereo imaging film after imaging according to the present disclosure. FIG. 6 is a schematic structural diagram of a graphic layer of a stereo imaging film according to the present disclosure. FIG. 7 is another schematic structural diagram of a graphic layer of a stereo imaging film according to the present disclosure.

In an embodiment, the present disclosure provides a stereo imaging film. The stereo imaging film includes a focusing layer 20 including at least one focusing unit, and the focusing unit includes a plurality of micro-nano structures 201; a graphic layer 30 including at least two graphic units in a same layer, the graphic unit includes a plurality of micrographics 301, the micrographics 301 of the at least two graphic units have different arrangements, and the micrographics 301 are spaced from each other. One focusing unit is provided corresponding to the at least two graphic units, and the at least two graphic units form graphic images with different image heights through focusing units. In the stereo imaging film, each micrographic 301 of each graphic unit one-to-one corresponds to the micro-nano structure 201. That is, each micro-nano structure 201 is adapted to the corresponding micrographics 301, and according to the Moire imaging principle, an image with a magnifying effect is formed, which is a virtual image. Therefore, the distribution regulation of each micrographic 301 of each graphic unit is the same as the distribution regulation of the micro-nano structures 201.

It should be noted that, each micro-nano structure 201 interacts with the corresponding micrographics 301 so as to form a graphic image with a magnifying effect.

It should be noted that, one micro-nano structure 201 is provided corresponding to at least two micrographics 301. For example, when one focusing unit is provided corresponding to two graphic units, one micro-nano structure 201 is provided corresponding to two micrographics 301.

It should also be noted that, the at least two micrographics 301 provided corresponding to the same micro-nano structure 201 are arranged at intervals, or have an overlapping portion or a common portion. When the micrographics 301 of different graphic units correspond to one micro-nano structure 201, they may be provided at intervals, partially overlapped or have a common portion. For example, if one micrographics is "H" and the other micrographics is "B", there would be an interval between "H" and "B", or the right vertical side of "H" and the left vertical side of "B" would be overlapped, or share a vertical side.

It should also be noted that the micro-nano structure 201 may be configured as a convex structure, and the convex structure includes one or more of cylindrical mirrors, spherical mirrors or aspherical mirrors. In an embodiment, the micro-nano structure 201 is a micro-lens or a Fresnel lens.

In some embodiments of the present disclosure, the main influencing factor of the stereo effect of the stereo suspension pattern is r, and by controlling different parameters, the Moire image presented in the same layer structure is expressed as a multi-layered Moire pattern, and the Moire pattern is capable of floating or sinking. The floating height or the sinking depth of the target graphics is calculated by the following formula:

$$h = k/(r-1).$$

It should be noted that, k is a constant and is related to the film thickness and the refractive index of the substrate, r is the scale factor, the closer the scale factor r is to 1, the higher (deeper) the suspension or sinking height (depth) is, and the greater the Moire magnification is. h>0 represents the floating height of the Moire pattern, and h<0 represents the sinking depth of the Moire pattern. The magnification m greater than 0 represents forward Moire magnification, and the magnification m less than 0 represents inverted Moire magnification.

The scale factor is calculated by the following formulas:

$$r=Tb/Tr,$$

where Tb is the period of the micrographic 301, Tr is the period of the micro-nano structure 201, and r≠1.

In some embodiments of the present disclosure, in one focusing unit, the micro-nano structures 201 are periodically arranged, the micrographics 301 of the at least two graphic units provided corresponding thereto are also periodically arranged, and the periods thereof are different from each other. The period of the graphic unit is different and the r value is different, the h of the formed graphic images is thereby different, and the graphic images are located at different heights, which are clearly distinguishable visually and thus achieve a better stereo effect.

It should be noted that, the graphic images formed by at least two graphic units through the same focusing unit have different image heights (i.e., different floating heights or sinking depths).

In some embodiments of the present disclosure, in one focusing unit, the micro-nano structures 201 are randomly arranged, and the micrographics 301 of the at least two graphic units corresponding provided thereto are also randomly arranged. The position coordinates of the micrographics 301 of the at least two graphic units are respectively obtained through different transformations according to the position coordinates of the micro-nano structure 201 of the focusing unit, and the transformation includes coordinate scaling transformation and/or coordinate rotation transformation. That is, in a focusing unit, the micro-nano structures 201 are randomly arranged, there is only one fixed point on the focusing unit, the micrographics 301 of the at least two graphic units are randomly distributed around the fixed point, and at least two images at different heights are formed by the at least graphic units through the focusing unit. At the same time, the micrographics 301 of the graphic units are randomly arranged, that is, the distances between adjacent micrographics 301 are the same or different.

In an embodiment, the randomly distributed micrographics 301 and the micro-nano structures 201 can form a unique suspended image.

In an embodiment, the scale factor r is calculated by the following formula:

$$r=Db/Dr.$$

In an embodiment, there exists a center point on both the graphic layer 30 and the focus layer 20, Db represents the distance from the position coordinate of the graphic layer 30 to the center point of the graphic layer 30, and Dr represents the distance between the position coordinate of the focus layer 20 and the center point of the focus layer 20.

It should be noted that, in the stereo imaging film, the distribution regulation of the micrographics 301 is determined by the distribution regulation of the micro-nano structures 201.

On the other hand, in a focusing unit, the color, shape, size, and type of the micrographics 301 of the same graphic unit are the same. Alternatively, there is at least one difference in the color, shape, type, and size of the micrographics 301 included in different graphic units.

In some embodiments, in the focusing layer 20, the micro-nano structures 201 are formed by hemispherical protrusions stamped in the polymer layer, and each micro-nano structure 201 has the same diameter as the others.

In some embodiments, in the focusing layer 20, each micro-nano structure 201 has the same shape and size with the others, and is a spherical protrusion, and the diameter thereof may be between 20 µm and 1000 µm.

In some embodiments of the present disclosure, the graphic layer 30 of the stereo imaging film includes grooves 302 and fillers 303 filled in the grooves 302. Adjacent micrographics 301 belonging to different graphic units have intersections 304, and the intersections 304 are located in the same groove 302. At the intersections 304, adjacent micrographics 301 have common portions.

It should be noted that, in the graphic layer 30, the micrographics 301 further includes one or more of printed patterns, embossed patterns, and line patterns.

When the graphic layer 30 is formed, the above-mentioned micrographics 301 may be formed by printing on a polymer layer, or the corresponding micrographics 301 may be stamped the polymer layer through a mold.

In addition, the micrographics 301 may further include filler pigments, so that the formed enlarged target graphic has a specific color.

In some embodiments of the present disclosure, the micro-nano structures 201 one-to-one corresponded to the micrographics 301, and the micrographics 301 are located at or close to the focal plane corresponding to the micro-nano structures 201. Therefore, the imaging effect of the micro-nano structures 201 to the micrographics 301 is better. For the lens (micro-nano structure 201), the focal plane thereof is defined as the plane passing through the focal point and perpendicular to the main optical axis of the system.

The total thickness of the stereo imaging film is between one half of the curvature radius of the micro-nano structure 201 to three times the curvature radius of the micro-nano structure 201. In order to make the micro-nano structure 201 more adoptable, the effective diameter of the micro-nano structure 201 may be (20 µm, 1000 µm), (20 µm, 500 µm), (55 µm, 200 µm), or (300 µm, 450 µm). In order to achieve a better imaging effect, the focal length of the micro-nano structure 201 may be (10 µm, 2000 µm), (20 µm, 100 µm), (200 µm, 450 µm), (550 µm, 900 µm), or (1050 µm, 1500 µm). In order to enlarge the applying arts of the stereo imaging film, the total thickness of the stereo imaging film is less than 5000 µm, for example, the thickness of the stereo imaging film may be (20 µm, 200 µm), which is used in upscale products and those products that require ultra-thin designs. Alternatively, the thickness of the stereo imaging film may be (300 µm, 500 µm), which is used for generally small-volume products and in those products without high thickness requirement. Alternatively, the thickness of the stereo imaging film may be (600 µm, 1000 µm), or even thicker, such as 1200 µm, 1300 µm, 1500 µm, 2000 µm, 2500 µm, 3500 µm or 4500 µm, etc.

In an embodiment, as shown in FIG. 1, in addition to the graphic layer 30 and the focusing layer 20, the stereo imaging film further includes a substrate layer 10. The graphic layer 30 is formed on one side of the substrate layer 10, and the focusing layer 20 is formed on the other side of substrate layer 10. The substrate layer 10 is made of a polymer material, which may be a resin layer, such as PET, PVC, or PMMA.

In another embodiment, as shown in FIG. 2, when the graphic layer 30 and the focusing layer 20 are formed, a plurality of micro-nano structures 201 are stamped on one side of the focusing layer 20. In addition, a plurality of micrographics 301 are stamped one side of the graphic layer 30. Since there is no structure such as substrate between the graphic layer 30 and the focusing layer 20, the thickness of the stereo imaging film can be reduced, and the mechanical property of the stereo imaging film is so poor that the stereo imaging film is readily cut off during hot stamping.

In still another embodiment, as shown in FIG. 3, the stereo imaging film includes a reflection layer 40, which is provided outside the focusing layer 20 and can improve the reflection effect.

The reflection layer 40 includes at least one of a single-layer dielectric layer, a multi-layer dielectric layer, a metal reflection layer 40, or a multi-layer structure consists of a metal reflection layer 40 and a dielectric layer.

In still another embodiment, as shown in FIG. 4, along the thickness direction of the stereo imaging film, the stereo imaging film may further include a protection layer. The protection layer is provided outside the graphic layer 30, and/or the protection layer is provided outside the focusing layer 20.

The protection layer may include a first protection layer 50 and/or a second protection layer 60, and both the first protection layer 50 and the second protection layer 60 are made of a transparent material.

The first protection layer 50 is provided on the outer side of the graphic layer 30, and/or the second protection layer 60 is provided on the outer side of the focusing layer 20. The first protection layer 50 is used to provide protection for the graphic layer 30, thereby preventing the deformation of the micrographics 301, and the second protection layer 60 can provide protection for the focusing layer 20, thereby preventing the damage of the micro-nano structure 201 and improving the service life of the stereo imaging film.

In some embodiments, as shown in FIGS. 5-6, the graphic layer 30 includes two graphic units, one of which includes a plurality of micrographics "A" and the other of which includes a plurality of micrographics "B", "A" and "B" overlap, and one micro-nano structure 201 corresponds to one "A" and one "B", respectively. The micro-nano structure 201 interacts with the corresponding "A" and "B" to form graphic images with magnification effect and different image heights.

In an embodiment, as shown in FIG. 7, the graphic layer 30 includes four graphic units, the four graphic units include four types of micrographics, and the four types of micrographics are circular structures with different diameters, respectively. The circular structures with different diameters overlap, and a micro-nano structure 201 has four micrographics with different diameters. The micro-nano structure 201 interacts with the corresponding micrographics with different diameters to form graphic images with magnification effects and different image heights.

The above are merely preferred embodiments of the present disclosure, and are not intended to be limitations to the present disclosure. Any modifications, equivalent replacements, improvements, etc. made within the spirit and principles of the present disclosure shall fall into the protection scope of the present disclosure.

What is claimed is:

1. A stereo imaging film, comprising:
a focusing layer comprising at least one focusing unit, wherein the at least one focusing unit each comprises a plurality of micro-nano structures; and
a graphic layer comprising at least two graphic units in a same layer, wherein the at least two graphic units each comprise a plurality of micrographics, the plurality of micrographics of the at least two graphic units have different arrangements;
wherein one of the at least one focusing unit is corresponding to the at least two graphic units, and the at least two graphic units form graphic images with different image heights through the focusing unit;
wherein the graphic layer of the stereo imaging film comprises grooves and fillers filled in the grooves, and adjacent micrographics of different graphic units have intersections located in a same groove.

2. The stereo imaging film according to claim 1, wherein in one of the at least one focusing unit, the plurality of micro-nano structures are periodically arranged, the plurality of micrographics of the corresponding at least two graphic units are also periodically arranged, and periods thereof are different from each other.

3. The stereo imaging film according to claim 1, wherein an image height of the graphic image is h; when h>0, the graphic image is floating, and when h<0, the graphic image is sinking.

4. The stereo imaging film according to claim 1, wherein in one of the at least one focusing unit, the plurality of micro-nano structures are randomly arranged, and the plurality of micrographics of the corresponding at least two graphic units are also randomly arranged.

5. The stereo imaging film according to claim 4, wherein position coordinates of the plurality of micrographics of the at least two graphic units are respectively obtained through different transformations according to position coordinates of the plurality of micro-nano structures of the focusing unit, and the transformations comprise coordinate scaling transformation and/or coordinate rotation transformation.

6. The stereo imaging film according to claim 1, wherein one micro-nano structure of the plurality of micro-nano structures is corresponding to at least two micrographics of the plurality of micrographics.

7. The stereo imaging film according to claim 6, wherein the at least two micrographics corresponding to the same micro-nano structure are arranged at intervals or have an overlapping portion or a common portion.

8. The stereo imaging film according to claim 1, wherein in one of the at least one focusing unit, the micrographics of the same graphic unit have a same color, shape, size, and type; or the micrographics comprises in different graphic units have at least one difference in color, shape, type, or size.

9. The stereo imaging film according to claim 1, further comprising a substrate layer and a reflection layer, wherein the graphic layer is formed on one side of the substrate layer, the focusing layer is formed on another side of the substrate layer, and the reflection layer is provided on a side of the focusing layer away from the graphic layer.

* * * * *